United States Patent
Feng et al.

(10) Patent No.: US 12,500,239 B2
(45) Date of Patent: Dec. 16, 2025

(54) ANODE MATERIAL, ANODE AND ELECTROCHEMICAL DEVICE COMPRISING THE ANODE MATERIAL

(71) Applicant: Ningde Amperex Technology Limited, Fujian (CN)

(72) Inventors: Pengyang Feng, Ningde (CN); Jiali Dong, Ningde (CN); Jia Tang, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 387 days.

(21) Appl. No.: 18/075,636

(22) Filed: Dec. 6, 2022

(65) Prior Publication Data

US 2023/0307638 A1    Sep. 28, 2023

Related U.S. Application Data

(63) Continuation of application No. 17/281,042, filed as application No. PCT/CN2020/078773 on Mar. 11, 2020, now Pat. No. 11,563,214.

(30) Foreign Application Priority Data

Mar. 21, 2019   (CN) .......................... 201910216007.X

(51) Int. Cl.
    *H01M 4/583*    (2010.01)
    *H01M 4/02*     (2006.01)
    (Continued)

(52) U.S. Cl.
    CPC .......... *H01M 4/583* (2013.01); *H01M 4/366* (2013.01); *H01M 4/623* (2013.01); *H01M 4/663* (2013.01); *H01M 4/667* (2013.01)

(58) Field of Classification Search
    None
    See application file for complete search history.

(56) References Cited

U.S. PATENT DOCUMENTS

| | | |
|---|---|---|
| 2004/0214085 A1 | 10/2004 | Sheem et al. |
| 2018/0342732 A1 | 11/2018 | Troegel et al. |
| 2020/0388851 A1 | 12/2020 | Jin et al. |

FOREIGN PATENT DOCUMENTS

| | | |
|---|---|---|
| CN | 1549362 A | 11/2004 |
| CN | 101604743 A | 12/2009 |

(Continued)

OTHER PUBLICATIONS

Office Action issued on Jun. 25, 2024, in corresponding European Application No. 20 710 754.1, 4 pages.

(Continued)

*Primary Examiner* — Tracy M Dove
(74) *Attorney, Agent, or Firm* — Maier & Maier, PLLC

(57) ABSTRACT

An anode material having $0.8 \leq 0.06 \times (Dv50)^2 - 2.5 \times Dv50 + Dv99 \leq 12$ (1); and $1.2 \leq 0.2 \times Dv50 - 0.006 \times (Dv50)^2 + BET \leq 5$ (2), where Dv50 represents a value in the volume-based particle size distribution of the anode material that is greater than the particle size of 50% of the particles, Dv99 represents a value in the volume-based particle size distribution of the anode material that is greater than the particle size of 99% of the particles, and BET is a specific surface area of the anode material, wherein Dv50 and Dv99 are expressed in μm and BET is expressed in $m^2/g$. The anode material is capable of significantly improving the rate performance of electrochemical devices.

22 Claims, 2 Drawing Sheets

(51) Int. Cl.
   *H01M 4/36*   (2006.01)
   *H01M 4/62*   (2006.01)
   *H01M 4/66*   (2006.01)

(56) References Cited

FOREIGN PATENT DOCUMENTS

| | | |
|---|---|---|
| CN | 102332604 A | 1/2012 |
| CN | 103078089 A | 5/2013 |
| CN | 103367710 | 10/2013 |
| CN | 103682350 A | 3/2014 |
| CN | 104106160 A | 10/2014 |
| CN | 104145358 A | 11/2014 |
| CN | 104282896 A | 1/2015 |
| CN | 104604000 A | 5/2015 |
| CN | 105190948 | 12/2015 |
| CN | 105794027 A | 7/2016 |
| CN | 106170880 | 11/2016 |
| CN | 106601994 A | 4/2017 |
| CN | 106611869 A | 5/2017 |
| CN | 106960945 A | 7/2017 |
| CN | 107331888 A | 11/2017 |
| CN | 107381563 A | 11/2017 |
| CN | 107431247 | 12/2017 |
| CN | 108232148 A | 6/2018 |
| CN | 108392893 A | 8/2018 |
| CN | 108511685 A | 9/2018 |
| CN | 108807847 | 11/2018 |
| CN | 108807848 A | 11/2018 |
| CN | 108807849 A | 11/2018 |
| CN | 108808068 | 11/2018 |
| CN | 108808072 A | 11/2018 |
| CN | 109449446 A | 3/2019 |
| CN | 109841831 | 6/2019 |
| EP | 3264501 A | 1/2018 |
| GB | 201414633 | 10/2014 |
| GB | 2529409 | 2/2016 |
| JP | 2004127913 A | 4/2004 |
| JP | 2014103095 A | 6/2014 |
| JP | 2015187972 A | 10/2015 |
| JP | 2016091638 A | 5/2016 |
| JP | 2017199657 | 11/2017 |
| JP | 6278135 | 2/2018 |
| KR | 1020180070302 A | 6/2018 |
| WO | 2018145732 | 8/2018 |

OTHER PUBLICATIONS

Office Action issued on Oct. 4, 2022, in corresponding Japanese Application No. 2021-510898, 6 pages.
Office Action issued on Mar. 16, 2023, in corresponding Chinese Application No. 202011437401.5, 21 pages.
Yang, "Lithium-Ion Battery Safety: Principles, Design and Testing", University of Electronic Science and Technology Press, ISSN: 978-7-5647-1147-4, May 2012, 6 pages.
Sun et al., "Effect of Small Size Graphite Particle on the Performance of Lithium-Ion Batteries", Chinese Battery Industry, China Academic Journal Electronic Publishing House, Dec. 2018, vol. 22, No. 6, 4 pages, with partial English translation.
Shen et al., "Relationship Between Initial Efficiency and Structure Parameters of Carbon Anode Material for Li-Ion Battery", J. Cent. South Univ. Technol., Springer, China Academic Journal Electronic Publishing House, 2008, vol. 15, 4 pages.
Bian, "Graphite Processing and Graphite Materials", China University of Mining and Technology Press, ISSN: 978-7-5646-2345-8, 2014, 7 pages.
Decision of Rejection dated Aug. 1, 2022, in corresponding Chinese Application No. 202011437401.5, 26 pages.
Office Action issued on Nov. 18, 2021, in connection with corresponding Chinese Application No. 202011437401.5, 27 pages.
Office Action issued on Apr. 6, 2022, in connection with corresponding Chinese Application No. 202011437401.5, 23 pages.
Extended European Search Report issued on Jan. 4, 2022, in connection with corresponding European Application No. 20710754.1; 9 pages.
Office Action issued on Feb. 3, 2022, in connection with corresponding Indian Application No. 202137009363, 6 pages.
Office Action issued on Oct. 4, 2022, in connection with corresponding Japanese Application No. 2021-510898, 8 pages.
Notification to Grant Patent Right for Invention issued on Oct. 14, 2020 in corresponding Chinese Application No. 201910216007.X, 2 pages.
International Search Report and Written Opinion issued on Jun. 4, 2020 in corresponding International Application No. PCT/CN2020/078773; 9 pages.
First Office Action issued on Apr. 24, 2020 in corresponding Chinese Application No. 201910216007.X; 14 pages.
Second Office Action issued on Jul. 16, 2020 in corresponding Chinese Application No. 201910216007.X; 12 pages.
郭永兴 (Guo Yongxing), 锂高子劫力屯池制造美键技木基础及其安全性研究 ("Study on preparation and safety of ithium ion power batteries"); Doctoral Dissertation; Research on the Key Technology Basis and Safety of Lithium-ion Power Battery Manufacturing; Central South University; Nov. 15, 2010; 32 pages.
Office Action issued on Jul. 25, 2022, in related U.S. Appl. No. 17/281,042, 17 pages.
Office Action issued on Mar. 28, 2022, in related U.S. Appl. No. 17/281,042, 20 pages.
Office Action issued on Mar. 1, 2022, in corresponding Japanese Patent Application No. 2021-510898, 8 pages.

US 12,500,239 B2

ANODE MATERIAL, ANODE AND ELECTROCHEMICAL DEVICE COMPRISING THE ANODE MATERIAL

CROSS REFERENCE TO RELATED APPLICATIONS

The present application is a continuation application of U.S. Ser. No. 17/281,042 filed on 29 Mar. 2021, which claims the benefit of priority from the Chinese Patent Application No. 201910216007.X, filed on 21 Mar. 2019, the disclosure of which is hereby incorporated by reference in its entirety.

TECHNICAL FIELD

The present application relates to the technical field of energy storage, and particularly to an anode material, an anode and an electrochemical device including the anode material.

BACKGROUND

With the development of power tools, the requirements for lithium-ion batteries suitable for power tools are also getting higher and higher. Particularly, the lithium-ion batteries are required to have a discharge performance of ultra-high power. This requires that the lithium ion batteries can achieve rapid intercalation and deintercalation of the lithium ions during the charge and discharge process.

SUMMARY

In order to meet the above-mentioned requirements for a super-large-rate lithium-ion battery, an embodiment of the present application provides an anode material. An embodiment of the present application also provides an anode, an electrochemical device, and an electronic device using the anode material.

According to a first aspect of the present application, the present application provides an anode material that meets the following relationship equations:

$$0.8 \leq 0.06 \times (Dv50)^2 - 2.5 \times Dv50 + Dv99 \leq 12 \quad (1), \text{ and}$$

$$1.2 \leq 0.2 \times Dv50 - 0.006 \times (Dv50)^2 + BET \leq 5 \quad (2)$$

wherein Dv50 represents a value in a volume-based particle size distribution of the anode material that covers the particle size of 50% of particles of the anode material, Dv99 represents a value in the volume-based particle size distribution of the anode material that covers the particle size of 99% of particles of the anode material, and BET is a specific surface area of the anode material, wherein Dv50 and Dv99 are expressed in μm and BET is expressed in m²/g.

In some embodiments, the anode material includes one or more selected from the group consisting of natural graphite or artificial graphite.

In some embodiments, at least a part of the surface of the anode material includes an amorphous carbon layer.

According to a second aspect of the present application, the present application provides an anode including an anode current collector and an anode active material layer, wherein the anode active material layer is disposed on at least one surface of the anode current collector, and the anode active material layer includes any one of the foregoing anode materials.

In some embodiments, the anode active material layer of the anode has a $C_{004}/C_{110}$ ratio of about 11.81 to about 17.08.

In some embodiments, the particle size Dv99 of the anode material and the thickness THK of the anode active material layer meet the following relationship equation:

$$Dv99 \leq 0.8 THK \leq 40 \quad (3), \text{ wherein THK is expressed in μm.}$$

In some embodiments, the coating weight of the anode material and the thickness THK of the anode active material layer meet the following relationship equation:

$$1.2 \leq CW/(THK \times 1540.25) \times 1000 \leq 1.9 \quad (4)$$

wherein CW represents the coating weight in mg of the anode active material layer in an area of 1540.25 mm² on one side of the anode.

In some embodiments, the anode active material layer further includes a binder, the binder includes one or more selected from the group consisting of polyvinylidene fluoride, a copolymer of vinylidene fluoride-hexafluoropropylene, a polyamide, polyacrylonitrile, a polyacrylate ester, polyacrylic acid, a polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber, an acrylate ester, or an epoxy resin.

In some embodiments, the anode further includes a conductive coating between the anode active material layer and the current collector. The conductive coating includes one or more selected from the group consisting of carbon fibers, Ketjen black, acetylene black, carbon nanotubes, or graphene.

In some embodiments, the anode active material layer has a CW of about 40 mg to about 100 mg.

In some embodiments, the anode material has a Dv50 of about 4 μm to about 17 μm, a Dv99 of about 15 μm to about 35 μm, and a specific surface area of about 1.0 m²/g to about 4.0 m²/g.

In some embodiments, the anode has a porosity of about 31% to about 41%.

In some embodiments, the conductive coating has a thickness of about 0.5 μm to about 1.5 μm.

According to a third aspect of the present application, the present application provides an electrochemical device, which includes a cathode, a separator, an electrolyte, and any one of the anodes described above.

In some embodiments, an anode active material layer on the anode has a $C_{004}/C_{110}$ ratio of about 7.45 to about 9.57 after the electrochemical device is fully charged and disassembled.

The technical solution of the present application improves the rate performance of the lithium ion battery mainly by the following two aspects: screening the particle size and specific surface area of the raw material to meet a certain range so as to reduce the transmission path in the transmission of the lithium ions, thereby accelerating the rapid deintercalation of the lithium ions; and limiting the coating weight and thickness of the anode active material so as to improve the infiltration ability of the electrolyte, thereby ultimately accelerating the transmission rate of the lithium ions.

Additional aspects and advantages of the embodiments of the present application will be partly described or shown in the following description or interpreted by implementing the embodiments of the present application.

BRIEF DESCRIPTION OF THE DRAWINGS

The drawings needed for describing the embodiments of the present application will be briefly described below to facilitate the description of the embodiments of the present application. Obviously, the drawings in the following description only show some embodiments of the present application. For those skilled in the art, the drawings of other embodiments can be obtained according to the structures illustrated in the drawings without creative effort.

DETAILED DESCRIPTION

Figure 1:
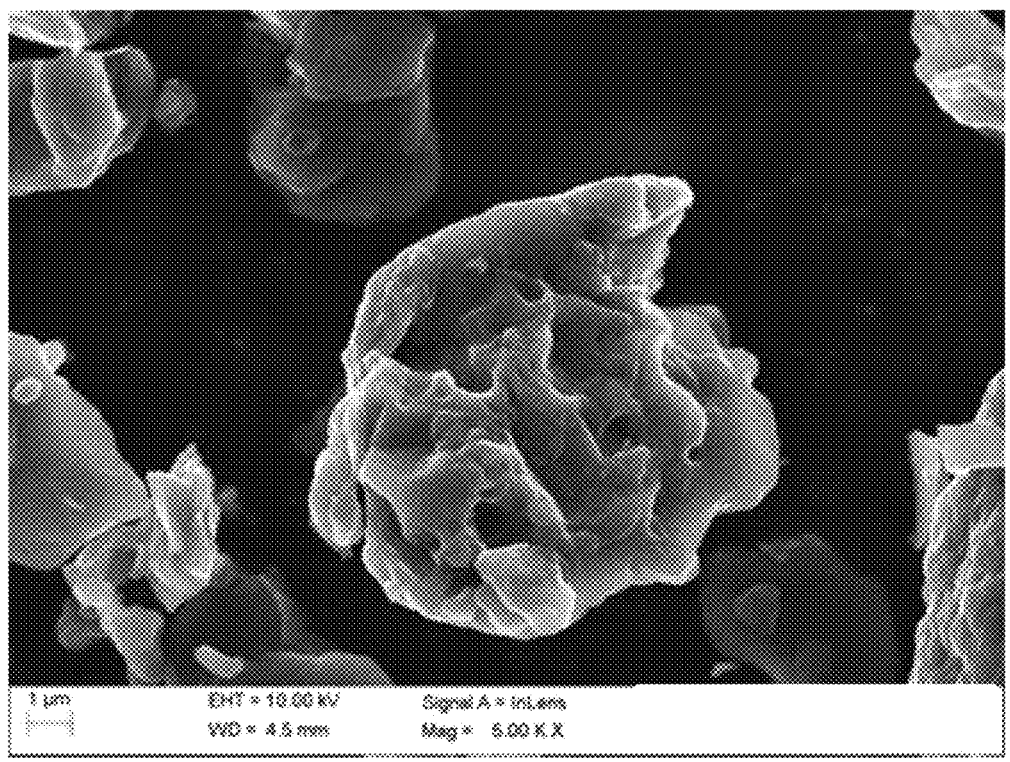
FIG. 1 shows an SEM image of the anode material in Example 6.

The present application will be described below in detail. It should be understood that terms used in the specification and the appended claims shall not be explained as being limited to meanings in a common sense and meanings found in dictionaries, but are explained based on meanings and concepts corresponding to the technical aspects of the present application on the basis of the principle that the inventor is allowed to properly define the terms to make an optimum explanation. Therefore, the implementations in the specification and the description in the drawings are merely specific examples used for the purpose of description rather than intentions to illustrate all technical aspects of the present application, and it should be understood that when the present application is filed, various alternative equivalents and variants may be made thereto.

As used in the present application, the terms "approximately", "substantially", "essentially", and "about" are used for describing and explaining a small variation. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the stated value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the value (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "substantially" the same.

In addition, amounts, ratios, and other values are sometimes presented in a range format in this application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

I. ANODE MATERIAL

The present application provides an anode material, which meets the following relationship equations:

$$0.8 \leq 0.06 \times (Dv50)^2 - 2.5 \times Dv50 + Dv99 \leq 12 \quad (1), \text{ and}$$

$$1.2 \leq 0.2 \times Dv50 - 0.006 \times (Dv50)^2 + BET \leq 5 \quad (2)$$

wherein Dv50, also referred to as "median particle size", represents a value in a volume-based particle size distribution of the anode material that covers the particle size of 50% of particles of the anode material, Dv99 represents a value in the volume-based particle size distribution of the anode material that covers the particle size of 99% of particles of the anode material, and BET is a specific surface area of the anode material, wherein Dv50 and Dv99 are expressed in μm and BET is expressed in m²/g.

The research in the present application shows that the particle size and the specific surface area of the anode active materials such as graphite can affect the intercalation or deintercalation path of the lithium ions, the speed of intercalation or deintercalation of the lithium ions, and the reaction of the lithium ions with the electrolyte, thus affecting the high-rate charge and discharge performance of lithium ion batteries, affecting the thickness of the solid-electrolyte interface (SEI) film formed during the first lithium intercalation process, and affecting the first coulombic efficiency of the lithium-ion batteries. The use of small-size graphite with excellent isotropy and a porous structure on the surface can reduce the specific surface area of the basal plane and increase the specific surface area of the edge plane as much as possible while keeping the total specific surface area unchanged. The edge plane is a plane in the Lc direction, the basal plane is a plane in the La direction, wherein La is an average size of the graphite crystal along the a-axis direction, and Lc refers to the thickness of the graphite sheets stacked along the c-axis direction perpendicular thereto. The increase in the specific surface area of the edge plane and the formation of a graphite surface with a porous structure enable lithium ions to directly enter in between the graphite sheets from the defect sites at the edge plane to realize rapid lithium ion migration, thereby further realizing the high-rate discharge performance of the lithium ions. During cycling, the de-intercalation of the lithium ions is more likely to cause expansion along the direction Lc, and the small particle size of excellent isotropy will suppress the expansion between graphite sheets, thereby improving cycling performance.

It is found after extensive research in the present application that when Dv50 and Dv99 of the anode material meet the relationship equation of (1) $0.8 \leq 0.06 \times (Dv50)2 - 2.5 \times Dv50 + Dv99 \leq 12$ and Dv50 and the specific surface area BET of the anode material meet the relationship equation of (2) $1.2 \leq 0.2 \times Dv50 - 0.006 \times (Dv50)^2 + BET \leq 5$, the characteristics of small particle size, high specific surface area at the edge plane, and low specific surface area at the basal plane of the anode material can be achieved. FIG. 1 is an SEM image showing the morphology of an anode material obtained in Example 6 of the present application. As shown in FIG. 1, the anode material meeting the relationship equations (1) and (2) has the characteristics of small particle size, excellent isotropy, and porous surface morphology.

In some embodiments, the anode material further meets the following relationship equation:

$$1.0 \leq 0.06 \times (Dv50)^2 - 2.5 \times Dv50 + Dv99 \leq 11.6 \quad (1)'.$$

In some embodiments, the anode material further meets the following relationship equation:

$$1.5 \leq 0.06 \times (Dv50)^2 - 2.5 \times Dv50 + Dv99 \leq 5.8 \quad (1)''.$$

In some embodiments, the anode material further meets the following relationship equation:

$$2.2 \leq 0.2 \times Dv50 - 0.006 \times (Dv50)^2 + BET \leq 3.6 \quad (2)'.$$

In some embodiments, the anode material has a Dv50 meeting the relationship equation of 4≤Dv50≤17. In some embodiments, the anode material has a Dv50 meeting the relationship equation of 4≤Dv50≤12. In some embodiments, the anode material has a Dv50 meeting the relationship equation of 5≤Dv50≤9. In some embodiments, the anode material has a Dv99 meeting the relationship equation of 15≤Dv99≤35. In some embodiments, the anode material has a Dv99 meeting the relationship equation of 17≤Dv99≤32. In some embodiments, the anode material has a Dv99 meeting the relationship equation of 18≤Dv99≤30. The particle sizes Dv50 and Dv99 of the anode material can be measured by a Malvern particle size analyzer, by the following steps: dispersing the anode material in a dispersant (ethanol or acetone, or other surfactant); ultrasonicating the obtained solution for 30 min; and testing the obtained sample after adding the obtained sample to the Malvern particle size analyzer. The specific surface area of the anode material can be measured by the Brunauer-Emmett-Teller (BET) test method. A Tri Star II specific surface analyzer is used. 3 g to 6 g of a sample is fed to a sample tube, positioned in a degassing station, heated, evacuated, and then cooled to room temperature after heating and evacuating. After removal, the weights of the sample and the sample tube are measured, and the sample is analyzed in an analysis station, followed by data processing and calculation.

In some embodiments, the anode material includes one or more selected from the group consisting of natural graphite, or artificial graphite.

In some embodiments, the anode material further includes one or more selected from the group consisting of crystalline silicon, silica, or silicon alloy.

In some embodiments, the natural graphite or the artificial graphite includes one or more selected from the group consisting of mesophase graphite, microcrystalline graphite, or expanded graphite.

In some embodiments, at least a part of the surface of the graphite includes amorphous carbon.

In some embodiments, the graphite surface is coated with amorphous carbon obtained by carbonizing an asphalt coating or a resin coating.

In some embodiments, the precursor of the artificial graphite is one or more selected from the group consisting of coal-based raw coke, coal-based calcined coke, petroleum-based raw coke, and petroleum-based calcined coke, and the particle diameter Dv50 of the coke is strictly controlled to about 4 μm to about 10.0 μm.

II. ANODE

The present application provides an anode including an anode current collector and an anode active material layer disposed on at least one surface of the anode current collector, wherein the anode active material layer includes any one of the anode materials according to the above embodiments. In some embodiments of the present application, the anode current collector may be, but is not limited to, copper foil or nickel foil.

In some embodiments, the anode active material layer has a d002 peak appearing at about 26.53790 to about 26.54480 and having a peak area of about 23190 (cts·° 2Th.) to about 24916 (cts·° 2Th.); a d004 peak appearing at about 54.632° to about 54.6400 and having a peak area of about 891.79 (cts·° 2Th.) to about 983.3 (cts·° 2Th.); and a d110 peak appearing at about 77.500 to about 77.540 and having a peak area of about 57.58 (cts·° 2Th.) to about 75.48 (cts·° 2Th.).

For crystalline graphite materials, the Bruker X-ray diffractometer is used to test the XRD according to JIS K 0131-1996 General rules for X-ray diffractometric analysis and JB/T 4220-2011 Determination method of artificial graphite lattice parameters. The varying peak positions represent different sizes of graphite unit cells, which reflects the degree of graphitization of graphite materials. The peak area is obtained by integrating the peak intensity against the half-peak width. The ratio of the peak area of the 004 peak to the peak area of the 110 peak is $C_{004}/C_{110}$.

$C_{004}/C_{110}$ affects the transmission path of the lithium ions. In some embodiments, the $C_{004}/C_{110}$ ratio of the anode active material layer on the anode of the present application is from about 11.81 to about 17.08. In some embodiments, the $C_{004}/C_{110}$ ratio of the anode active material layer on the anode of the present application is from about 12.00 to about 16.15. In some embodiments, the $C_{004}/C_{110}$ ratio of the anode active material layer on the anode of the present application is from about 12.03 to about 15.45.

In order to achieve a high-rate discharge performance, a thin film coating process is used for the production of the anode in the present application. The thickness of the anode is reduced to enable rapid electrolyte infiltration, so that the lithium ions can be quickly intercalated into and deintercalated from the surface of the anode material to complete the intercalation and deintercalation process of the lithium ions.

The thin film coating process can be achieved by controlling the particle size Dv99 of the anode material and the thickness THK of the anode active material layer, or by controlling the relationship between the thickness THK of the anode active material layer and the coating weight CW.

In some embodiments, the particle size Dv99 of the anode material and the thickness THK of the anode active material layer meet the following relationship equation:

$$Dv99 \leq 0.8 THK \leq 40 \quad (3), \text{ wherein Dv99 and THK are expressed in μm.}$$

In some embodiments, the particle size Dv99 of the anode material and the thickness THK of the anode active material layer meet the following relationship equation:

$$Dv99 \leq 0.8 THK \leq 25 \quad (3)', \text{ wherein Dv99 and THK are expressed in μm.}$$

In some embodiments, the coating weight of the anode material and the thickness THK of the anode active material layer meet the following relationship equation:

$$1.2 \leq CW/(THK \times 1540.25) \times 1000 \leq 1.9 \quad (4)$$

wherein THK is expressed in μm, and CW represents the coating weight in mg of the anode active material layer in an area of 1540.25 mm² on one side of the anode.

In some embodiments, the coating weight of the anode material and the thickness THK of the anode active material layer meet the following relationship equation:

$$1.3 \leq CW/(THK \times 1540.25) \times 1000 \leq 1.7 \quad (4)'.$$

In some embodiments, the anode active material layer further includes a binder, the binder includes one or more selected from the group consisting of polyvinylidene fluoride, a copolymer of vinylidene fluoride-hexafluoropropylene, a polyamide, polyacrylonitrile, a polyacrylate ester, polyacrylic acid, a polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber, an acrylate ester, or an epoxy resin.

In some embodiments, the anode active material layer further includes a conductive agent.

In some embodiments, the conductive agent includes one or more selected from the group consisting of carbon fibers, Ketjen black, acetylene black, carbon nanotubes, or graphene.

In some embodiments, the anode further includes a conductive coating between the anode active material layer and the current collector.

In some embodiments, the conductive coating includes one or more selected from the group consisting of carbon fibers, Ketjen black, acetylene black, carbon nanotubes, or graphene.

In some embodiments, the conductive coating is disposed on at least a part of the surface of the current collector.

In some embodiments, the conductive coating further includes a binder, the binder includes one or more selected from the group consisting of polyvinylidene fluoride, a copolymer of vinylidene fluoride-hexafluoropropylene, a polyamide, polyacrylonitrile, a polyacrylate ester, polyacrylic acid, a polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber, an acrylate ester, or an epoxy resin.

In some embodiments, the conductive coating has a thickness of about 0.5 μm to about 1.5 μm.

An appropriate thickness of the conductive coating contributes to the conduction of electrons and increases the adhesion of the active material layer to the current collector to reduce the peeling of the active material layer during cycling, so that the lithium ion battery exhibits lowered charge transfer resistance and better dynamics.

In some embodiments, the anode active material layer has a CW of about 40 mg to about 100 mg.

In some embodiments, the anode active material layer has a density of about 0.032 mg/mm$^2$ to about 0.058 mg/mm$^2$.

In some embodiments, the anode material has a Dv50 of about 4 μm to about 17 μm and a Dv99 of about 15 μm to about 35 μm, wherein Dv50≤Dv99≤4 Dv50; and a specific surface area BET of about 1.0 m$^2$/g to about 4.0 m$^2$/g. Moreover, the anode active material layer on the anode has a porosity of about 31% to about 41%.

In some embodiments, the adhesion strength between the anode active material layer and the current collector is about 1.0 N/m to about 15 N/m, and the cohesion strength between particles of the anode material is about 0.5 N/m to about 13 N/m.

In some embodiments, the adhesion strength between the anode active material layer and the current collector is about 2.8 N/m to about 4.2 N/m, and the cohesion strength between particles of the anode material is about 1.5 N/m to about 2.9 N/m.

In some embodiments, the slurry for producing the anode has a Dv50 of about 4.5 μm to about 9.1 μm, and a Dv90 of about 12.5 μm to about 27.6 μm.

III. ELECTROCHEMICAL DEVICE

An embodiment of the present application also provides an electrochemical device using the anode material of the present application.

In some embodiments, the anode active material layer on the anode has a $C_{004}/C_{110}$ ratio of about 7.45 to about 9.57 after the electrochemical device is fully charged and disassembled. In some embodiments, the anode active material layer on the anode has a $C_{004}/C_{110}$ ratio of about 7.95 to about 9.17 after the electrochemical device is fully charged and disassembled. In some embodiments, the anode active material layer on the anode has a $C_{004}/C_{110}$ ratio of about 8.35 to about 8.97 after the electrochemical device is fully charged and disassembled. After a battery is fully charged and disassembled, the anode active material layer on the anode having a $C_{004}/C_{110}$ ratio falling in such a range can improve the rate performance and dynamic performance of the battery. In some embodiments, after the electrochemical device is fully charged and disassembled, the anode active material layer on the anode has a 002 peak appearing at about 26.53790 to about 26.54230 and having a peak area of about 145955 (cts·° 2Th.) to about 15145 (cts·° 2Th.); a 004 peak appearing at about 54.629° to about 54.640° and having a peak area of about 517.345 (cts·° 2Th.) to about 525.03 (cts·° 2Th.); and a 110 peak appearing at about 77.490 to about 77.500 and having a peak area of about 60.365 (cts·° 2Th.) to about 62.11 (cts·° 2Th.).

In some embodiments, after the electrochemical device is fully charged and disassembled, the weight ratio of the element Li to the element S in the anode active material layer on the anode is about 25:1 to about 34:1.

In some embodiments, after the electrochemical device is fully charged and disassembled, the weight ratio of the element Li to the element P in the anode active material layer on the anode is about 11:1 to about 14:1.

In some embodiments, after the electrochemical device is fully charged and disassembled, the weight ratio of the element C to the element S in the anode active material layer on the anode is about 185:1 to about 439:1.

In some examples, the electrochemical device includes a cathode including a cathode material, an anode including an anode material of the present application, a separator, and an electrolyte. In some embodiments of the present application, the electrochemical device is a lithium ion battery. In the lithium ion battery, the cathode includses a cathode material capable of absorbing and releasing lithium (Li) (hereinafter, sometimes referred to as "a cathode material capable of absorbing/releasing lithium (Li)") and a cathode current collector. In some embodiments of the present application, the cathode current collector may be, but is not limited to, aluminum foil or nickel foil. Examples of the cathode material capable of absorbing/releasing lithium (Li) may include one or more of lithium cobalt oxide, lithium nickel cobalt manganese oxide, lithium nickel cobalt aluminum oxide, lithium manganese oxide, lithium manganese iron phosphate, lithium vanadium phosphate, lithium vanadyl phosphate, lithium iron phosphate, lithium titanium oxide or a lithium-containing manganese-based material.

In the cathode material, the chemical formula of lithium cobalt oxide may be $Li_xCo_aM1_bO_{2-c}$, wherein M1 is selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si) and combinations thereof, and x, a, b and c are respectively in the following ranges: 0.8≤x≤1.2, 0.8≤A≤1, 0≤b≤0.2, and −0.1≤c≤0.2.

In the cathode material, the chemical formula of lithium nickel cobalt manganese oxide or lithium nickel cobalt aluminum oxide may be $Li_yNi_dM2_eO_{2-f}$, wherein M2 is selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), silicon (Si), and combinations thereof, and y, d, e and f are respectively in the following ranges: $0.8 \leq y \leq 1.2$, $0.3 \leq d \leq 0.98$, $0.02 \leq e \leq 0.7$, and $-0.1 \leq f \leq 0.2$.

In the cathode material, the chemical formula of lithium manganese oxide is $Li_zMn_{2-g}M3_gO_{4-h}$, wherein M3 is selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), and combinations thereof, and z, g and h are respectively in the following ranges: $0.8 \leq z \leq 1.2$, $0 \leq g \leq 1.0$, and $-0.2 \leq h \leq 0.2$.

The lithium ion battery further includes an electrolyte, which may be in one or more of a gel state, a solid state, and a liquid state. The liquid electrolyte includes a lithium salt and a non-aqueous solvent.

The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, LiBOB, and $LiPO_2F_2$. For example, the lithium salt is $LiPF_6$, because it can provide high ionic conductivity and improve cycling characteristics.

The non-aqueous solvent may be a carbonate compound, a carboxylate compound, an ether compound, a nitrile compound, other organic solvents or a combination thereof.

Examples of the carbonate compound include diethyl carbonate (DEC), dimethyl carbonate (DMC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate and combinations thereof.

In some embodiments, the content of the carbonate compound is about 1 wt % or more based on the total weight of the electrolyte. In some embodiments, the content of the carbonate compound is about 3 wt % or more. In some embodiments, the content of the carbonate compound is about 5 wt % or more. In some embodiments, the content of the carbonate compound is about 10 wt % or more. In some embodiments, the content of the carbonate compound is about 50 wt % or more. In some embodiments, the content of the carbonate compound is about 58 wt % or more. In some embodiments, the content of the carbonate compound is about 60 wt % or less. In some embodiments, the content of the carbonate compound is about 50 wt % or less. In some embodiments, the content of the cyclic carbonate compound is about 40 wt % or less. In some embodiments, the content of the carbonate compound is about 1 wt % to about 60 wt %. In some embodiments, the content of the carbonate compound is about 3 wt % to about 50 wt %.

Examples of the carboxylate compound include methyl acetate, ethyl acetate, n-propyl acetate, t-butyl acetate, methyl propionate, ethyl propionate, propyl propionate, γ-butyrolactone, decalactone, valerolactone, mevalonolactone, caprolactone, or a combination thereof.

In some embodiments, the content of the carboxylate compound is about 1 wt % or more based on the total weight of the electrolyte. In some embodiments, the content of the carboxylate compound is about 3 wt % or more. In some embodiments, the content of the carboxylate compound is about 5 wt % or more. In some embodiments, the content of the carboxylate compound is about 10 wt % or more. In some embodiments, the content of the carboxylate compound is about 60 wt % or less. In some embodiments, the content of the carboxylate compound is about 50 wt % or less. In some embodiments, the content of the carboxylate compound is about 40 wt % or less. In some embodiments, the content of the carboxylate compound is about 1 wt % to about 60 wt %. In some embodiments, the content of the carboxylate compound is about 3 wt % to about 50 wt %.

Examples of the ether compound include tetrahydrofuran, 2-methyltetrahydrofuran, 1,3-dioxolane, 2-methyl-1,3-dioxolane, 4-methyl-1,3-dioxolane, 1,3-dioxane, 1,4-dioxane, dimethoxypropane, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, 1,2-ethoxymethoxyethane, $HCF_2CF_2CH_2OCF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, and combinations thereof.

In some embodiments, the content of the ether compound is about 0.01 wt % or more based on the total weight of the electrolyte. In some embodiments, the content of the ether compound is about 0.05 wt % or more. In some embodiments, the content of the ether compound is about 1 wt % or more. In some embodiments, the content of the ether compound is about 2 wt % or more. In some embodiments, the content of the ether compound is about 10 wt % or less. In some embodiments, the content of the ether compound is about 6 wt % or less. In some embodiments, the content of the ether compound is about 5 wt % or less. In some embodiments, the content of the ether compound is about 0.01 wt % to about 10 wt %. In some embodiments, the content of the ether compound is about 1 wt % to about 6 wt %.

Examples of the nitrile compound include butanedinitrile, glutaronitrile, adipodinitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylglutaronitrile, 2,4-dimethylglutaronitrile, 2,2,4,4-tetramethylglutaronitrile, 1,4-dicyanopentane, 1,4-dicyanopentane, 2,5-dimethyl-2,5-hexanedinitrile, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxapimelonitrile, 1,4-bis(cyanoethoxy)butane, ethylene glycol bis(2-cyanoethyl)ether, diethylene glycolbis(2-cyanoethyl) ether, triethylene glycolbis(2-cyanoethyl)ether, tetraethylene glycolbis(2-cyanoethyl)ether, 3,6,9,12,15,18-hexaoxaeicosanoic dinitrile, 1,3-bis(2-cyanoethoxy) propane, 1,4-bis(2-cyanoethoxy)butane, 1,5-bis(2-cyanoethoxy)pentane, ethylene glycol bis(4-cyanobutyl) ether, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane or 1,2,4-tris (2-cyanoethoxy)butane, and combinations thereof.

In some embodiments, the content of the nitrile compound is about 0.01 wt % or more based on the total weight of the electrolyte. In some embodiments, the content of the nitrile compound is about 0.05 wt % or more. In some embodiments, the content of the nitrile compound is about 1 wt % or more. In some embodiments, the content of the nitrile compound is about 2 wt % or more. In some embodiments, the content of the nitrile compound is about 10 wt % or less. In some embodiments, the content of the nitrile compound is about 6 wt % or less. In some embodiments, the content of the nitrile compound is about 5 wt % or less. In some embodiments, the content of the nitrile compound is about 0.01 wt % to about 10 wt %. In some embodiments, the content of the nitrile compound is about 1 wt % to about 6 wt %.

Examples of other organic solvents include dimethyl sulfoxide, 1,3-propane sultone, sulfolane, methyl sulfolane, 1,3-dimethyl-2-imidazolidinone, N-methyl-2-pyrrolidone, formamide, dimethylformamide, trimethyl phosphate, triethyl phosphate, trioctyl phosphate, propyl phosphate, and combinations thereof.

In some embodiments, the electrochemical device of the present application is provided with a separator between the cathode and the anode to prevent a short circuit. The material and shape of the separator used in the electrochemical device of the present application are not particularly limited, and may be any of the techniques disclosed in prior art. In some embodiments, the separator includes a polymer or an inorganic substance or the like formed of a material which is stable in the electrolytic solution of the present application.

For example, the separator may include a substrate layer and a surface treatment layer. The substrate layer is a non-woven fabric, film, or composite film having a porous structure, and the material of the substrate layer is at least one selected from the group consisting of polyethylene, polypropylene, polyethylene terephthalate, and polyimide. Particularly, a porous polypropylene film, a porous polyethylene film, a polypropylene nonwoven fabric, a polyethylene nonwoven fabric, and a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic material.

The inorganic layer includes inorganic particles and a binder. The inorganic particles are at least one selected from the group consisting of alumina, silica, magnesia, titania, hafnium dioxide, tin oxide, cerium dioxide, nickel oxide, zinc oxide, calcium oxide, zirconia, yttria, silicon carbide, boehmite, aluminum hydroxide, magnesium hydroxide, calcium hydroxide and barium sulfate, or a combination of more than one thereof. The binder is one or more selected from the group consisting of polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene, or a combination of more than one thereof. The polymer layer contains a polymer, and the material of the polymer includes at least one of a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

The separator needs to be mechanically robust to withstand the stretching and puncture of the electrode material, and the separator usually has a pore size of less than 1 micron. Various separators including microporous polymer films, non-woven fabric mats and inorganic films have been used in lithium-ion batteries, of which polymer films based on microporous polyolefin materials are the separators most commonly used in combination with the electrolytes. Microporous polymer films can be made very thin (usually about 5 μm to 25 μm) and highly porous (usually about 20% to 50%) to reduce the electrical resistance and improve the ion conductivity. At the same time, the polymer film still has mechanical robustness. Those skilled in the art should understand that various separators widely used in lithium ion batteries are suitable for use in the present application.

Although a lithium ion battery is exemplified above, other suitable electrochemical devices that the cathode material of the present application can be used therewith may occur to those skilled in the art after reading this application. Such electrochemical devices include any device in which an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery.

IV. ELECTRONIC DEVICE

An embodiment of the present application provides an electronic device, which may be any device using an electrochemical device according to an embodiment of the present application.

According to some embodiments of the present application, the electronic device comprises, but is not limited to, notebook computers, pen-input computers, mobile computers, e-book players, portable phones, portable fax machines, portable copiers, portable printers, head-mounted stereo headphones, video recorders, LCD TVs, portable cleaners, portable CD players, mini disc players, transceivers, electronic notebooks, calculators, memory cards, portable recorders, radios, backup power sources, motors, vehicles, motorcycles, scooters, bicycles, lighting apparatus, toys, game consoles, clocks, electric tools, flashing light, cameras, large batteries for household use, and lithium ion capacitors.

Hereinafter, the benefits and advantages brought by the present application are explained by taking a lithium ion battery as an example in connection with a specific embodiment for preparing an anode material of the present application and a test method for an electrochemical device. However, those skilled in the art will understand that the preparation methods described in the present application are merely exemplary, and any other suitable preparation methods also fall within the protection scope of the present application.

V. EXAMPLES

Performance Test
(1) SEM Test

A scanning electron microscope (SEM) was used for obtaining a morphological structure of a sample through interaction of an electron beam and the sample and by using secondary electron signals for imaging. The SEM used in the present application was a JEOL Company JSM-6360LV Model SEM and an X-ray energy spectrometer fitted thereto, which were used for analyzing the morphological structure and element distribution of the sample.

(2) DC Resistance Test (DCR)

The lithium-ion battery was charged to 4.2 V at a constant current of 1.5 C, and then charged to 0.05 C at a constant voltage; allowed to stand for 30 min; and discharged at 0.1 C for 10 s (sampled once every 0.1 s to record the corresponding voltage U1), and then discharged at 1 C for 360 s (sampled once every 0.1 s to record the corresponding voltage U2). The charging and discharging procedure was repeated 5 times. "1 C" is the current value when the battery capacity is completely discharged within 1 hour.

DCR is calculated according to the following formula: R=(U2−U1)/(1C−0.1C). The DCR mentioned in the present application is a value at 50% SOC (state of charge).

(3) High-Rate Discharge Test (at 135 C for 3 s)

The lithium-ion battery was discharged to 3.0 V at a constant current of 1 C under normal temperature, and allowed to stand for 10 min. Then the battery was charged to 4.2 V at a constant current of 1.5C, and then charged to 0.02 C at a constant voltage of 4.2 V. After standing for 5 min, the lithium-ion battery was discharged at a constant current of 135 C for 3 seconds, and the voltage at the end of 3 seconds was taken as a criterion for evaluating the high-rate discharge performance of the lithium-ion battery at 135 C.

(4) Cycle Test at 45° C.

The test battery was allowed to stand for 5 min at a test temperature of 45° C. The lithium-ion battery was charged to 4.2 V at a constant current of 1.5C, and then charged to 0.05 C at a constant voltage of 4.2 V; allowed to stand for 5 min; and discharged to 3.0 V at a constant current of 1.5 C and allowed to stand for 5 min. The charge and discharge process was repeated 500 times, and the discharge capacity after each cycle was recorded. The capacity retention rate after a cycle of the lithium-ion battery was calculated by the following formula:

Capacity retention rate after a cycle=(Discharge capacity after a cycle/Discharge capacity of the first cycle)×100%

1. Examples 1-22 and Comparative Examples 1-3

In order to discuss the effects of Dv50 and Dv99 on the performance of the anode material, in Examples 1-22 and Comparative Examples 1-3 of the present application, the effects of the variables Dv50 and the correlation coefficient between Dv50 and Dv99 (0.06×(Dv50)$^2$−2.5×Dv50+Dv99), and the variables Dv50 and the correlation coefficient between Dv50 and BET (0.2×Dv50−0.006×(Dv50)$^2$+BET) on the cold-pressing effect of the anode, the adhesion strength between the anode active material layer and the anode current collector, and the DCR of a lithium ion battery producing with a corresponding anode material were studied, wherein Dv50 and Dv99 were expressed in μm.

In the present application, a Malvern particle size analyzer was used to measure the particle size of the anode material. The anode material was dispersed in a dispersant (ethanol), and ultrasonicated for 30 min. Then, the sample was added to the Malvern particle size analyzer and tested. From the small particle-size side of the volume-based particle size distribution of the anode material, the particle size that reaches a 50% cumulative volume distribution is Dv50, that is, the average particle size of the anode material; and from the small particle-size side of the volume-based particle size distribution of the anode material, the particle size that reaches 99% cumulative volume distribution is Dv99 of the anode material.

The preparation process in Examples 1-22 and Comparative Examples 1-3 were as follows.

Preparation of anode: Artificial graphite meeting the relationship equations $0.8 \le 0.06 \times (Dv50)^2 - 2.5 \times Dv50 + Dv99 \le 12$ (1) and $1.2 \le 0.2 \times Dv50 - 0.006 \times (Dv50)^2 + BET \le 5$ (2), styrene-butadiene rubber (SBR), and sodium carboxymethylcellulose (CMC) were dispersed in deionized water solvent at a weight ratio of 97.4:1.2:1.4, mixed uniformly by fully stirring, coated on a Cu foil anode current collector pre-coated with a 1 μm-thick acetylene black conductive coating, dried, and cold pressed to obtain an anode. The artificial graphite in Examples 1-21 and Comparative Examples 1-3 contained amorphous carbon on the surface, and the artificial graphite in Example 22 did not contain amorphous carbon on the surface.

Preparation of cathode: The cathode active material lithium cobalt oxide (LiCoO$_2$), the conductive agent acetylene black, and the binder polyvinylidene fluoride (PVDF) were mixed uniformly at a weight ratio of 96:2:2 by fully stirring in a suitable amount of N-methylpyrrolidone (NMP) solvent, coated onto an Al foil cathode current collector, dried, and cold pressed to obtain a cathode.

Separator: A 12 μm porous PE polymer film was used as a separator.

Electrolyte: Under a dry argon atmosphere, EC, PC, and DEC (at a weight ratio of about 1:1:1) were mixed, and then LiPF$_6$ was added and mixed until uniform, wherein the concentration of LiPF$_6$ was 1.15 mol/L. Based on the total weight of the electrolyte, 3% of fluoroethylene carbonate was added to the electrolyte.

Preparation of the lithium-ion batteries: The cathode, the separator, and the anode were laminated in order such that the separator was located between the cathode and the anode for isolation. It was wound, placed in an outer package, injected with an electrolyte, encapsulated, formed, degassed, and trimmed to obtain a lithium-ion battery.

Table 1 lists the adopted Dv57, the correlation coefficient between Dv50 and Dv99, and the correlation coefficient between Dv50 and BET of the graphite, the appearance of the anode, the DC resistance (DCR), and the discharge voltage at 135 C for 3 s of the lithium ion battery in Examples 1-22 and Comparative Examples 1-3.

TABLE 1

| | Value of (0.06 × (Dv50)2-2.5 × Dv50 + Dv99) | Value of (0.2 × Dv50-0.006 × (Dv50)$^2$ + BET) | Dv50 (μm) | Cold-pressed appearance | DCR (mΩ) | Discharge voltage (V) at 135 C. for 3 s |
|---|---|---|---|---|---|---|
| Example 1 | 1 | 2.2 | 7 | Excellent | 11.02 | 2.52 |
| Example 2 | 1 | 2.7 | 7 | Excellent | 10.82 | 2.54 |
| Example 3 | 1 | 3.6 | 7 | Excellent | 10.7 | 2.55 |
| Example 4 | 1 | 5.0 | 7 | Excellent | 10.58 | 2.57 |
| Example 5 | 5 | 2.2 | 7 | Excellent | 11.26 | 2.5 |
| Example 6 | 5 | 2.7 | 7 | Excellent | 11.05 | 2.51 |
| Example 7 | 5 | 3.6 | 7 | Excellent | 10.89 | 2.53 |
| Example 8 | 5 | 5.0 | 7 | Excellent | 10.72 | 2.55 |
| Example 9 | 8 | 2.2 | 7 | Slight protrusion of particles | 11.38 | 2.43 |

TABLE 1-continued

| | Value of (0.06 × (Dv50)2−2.5 × Dv50 + Dv99) | Value of (0.2 × Dv50−0.006 × (Dv50)² + BET) | Dv50 (μm) | Cold-pressed appearance | DCR (mΩ) | Discharge voltage (V) at 135 C. for 3 s |
|---|---|---|---|---|---|---|
| Example 10 | 8 | 2.7 | 7 | Slight protrusion of particles | 11.21 | 2.46 |
| Example 11 | 8 | 3.6 | 7 | Slight protrusion of particles | 11.1 | 2.49 |
| Example 12 | 8 | 5 | 7 | Slight protrusion of particles | 10.83 | 2.53 |
| Example 13 | 12 | 2.2 | 7 | Scratches and protrusions of particles | 11.88 | 2.4 |
| Example 14 | 12 | 2.7 | 7 | Scratches and protrusions of particles | 11.62 | 2.41 |
| Example 15 | 12 | 3.6 | 7 | Scratches and protrusions of particles | 11.38 | 2.43 |
| Example 16 | 12 | 5 | 7 | Scratches and protrusions of particles | 11.22 | 2.45 |
| Example 17 | 5 | 2.7 | 5 | Excellent | 10.01 | 2.57 |
| Example 18 | 5 | 2.7 | 6 | Excellent | 10.89 | 2.55 |
| Example 19 | 5 | 2.7 | 7.5 | Excellent | 11.16 | 2.5 |
| Example 20 | 5 | 2.7 | 8 | Excellent | 11.27 | 2.46 |
| Example 21 | 5 | 2.7 | 9 | Excellent | 12.29 | 2.36 |
| Example 22 | 5 | 2.7 | 7 | Excellent | 13.89 | 2.12 |
| Comparative Example 1 | 15 | 2.7 | 7 | Scratches and protrusions of particles | 12.01 | 2.4 |
| Comparative Example 2 | 0.5 | 2.7 | 7 | Excellent | 11.86 | 2.32 |
| Comparative Example 3 | 5 | 5.5 | 7 | Excellent | 16.87 | 2.29 |

The analysis of Example 6 and Comparative Examples 1-2 shows that, when Dv50 and the value of relationship equation (2) remain unchanged, by adjusting the value of relationship equation (1), the anode material in Example 6 that meets relationship equation (1) $0.8 \leq 0.06 \times (Dv50)^2 - 2.5 \times Dv50 + Dv99 \leq 12$ has a lower DCR and a higher discharge voltage at 135 C for 3 s, compared with the anode materials in Comparative Example 1 and Comparative Example 2 that do not meet relationship equation (1). The anode material meeting relationship equations (1) and (2) has a lower DCR and a higher discharge voltage at 135 C for 3 s. This is mainly because that the anode material meeting relationship equations (1) and (2) has the following functions: effectively shortening the deintercalation path of the lithium ions to realize the rapid intercalation or deintercalation of the lithium ions, thereby improving the high-rate charge and discharge performance of the lithium ion battery; reducing the specific surface area of the basal plane and increasing the specific surface area of the edge plane as much as possible while maintaining the total specific surface area unchanged, which allows the lithium ions to directly enter in between the graphite sheets from the defect sites at the edge plane to realize rapid lithium ion migration, thereby further realizing a high-rate discharge performance of the lithium ions; and suppressing the expansion between the graphite sheets, thus improving cycling performance.

It can be seen from the respective analysis of Examples 1-4, Examples 5-8, Examples 9-12, and Examples 13-16 that when relationship equation (1) $0.8 \leq 0.06 \times (Dv50)^2 - 2.5 \times Dv50 + Dv99 \leq 12$ and relationship equation (2) $1.2 \leq 0.2 \times Dv50 - 0.006 \times (Dv50)^2 + BET \leq 5$ are met, and the value of relationship equation (1) and Dv50 remain constant: as the value of relationship equation (2) increases, DCR tends to decrease and the discharge voltage at 135C for 3 s tends to increase. This may be because when the value of relationship equation (1) and Dv50 remain constant, as the value of relationship equation (2) increases, the BET value increases accordingly. In the situation where the particle size distribution of the anode material remains basically the same within the range, as the contact area between the material and the electrolyte increases, the solvated lithium transported by the electrolyte will reach the surface of the anode material more easily, the SEI film formed by the electrolyte is in a proper range, the side reactions are suppressed during the charge and discharge process, thereby accelerating the intercalation or deintercalation of the lithium ions, and resulting in reduced resistance in the transmission of the lithium ions and optimized discharge performance. Within this range, the contact between particles becomes good, contact impedance is reduced, and the possibility of overlapped distribution of two large particles in the anode is reduced, and the risk of scratches and protrusions of the particles is lowered. It has been found through research that when the specific surface area BET of the anode material is about 1.0 m²/g to about 4.0 m²/g, the lithium ion battery prepared therefrom has better electrochemical performance.

Analysis of Example 22 and Example 6 shows that compared to Example 22 where a graphite anode without an amorphous carbon coating is used, the use of an amorphous carbon-coated graphite anode in Example 6 shows a lower DCR and higher discharge voltage at 135C for 3 s. This may be because the amorphous carbon structure coated on the graphite surface enables the lithium ions to quickly enter the surface of the amorphous carbon during the initial stage of lithium intercalation and deintercalation, and direct lithium intercalation and deintercalation occur on the surface of the amorphous carbon. Thus, high-rate charge and discharge of the lithium battery are achieved.

Figure 2:
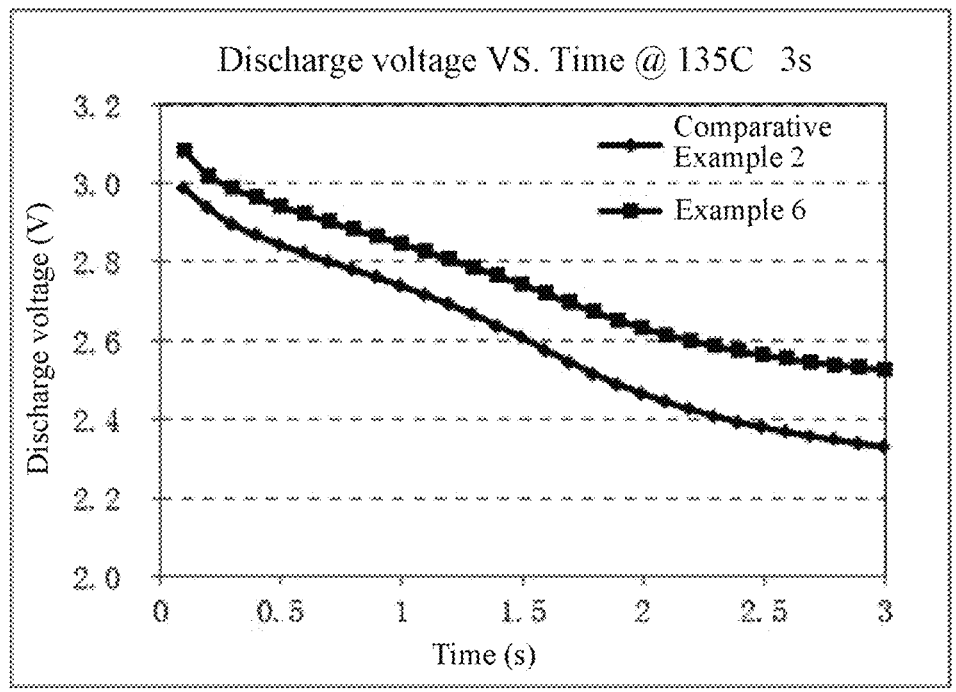
FIG. 2 shows the relationship between the discharge time and the discharge cut-off voltage of the lithium ion batteries of Example 6 and Comparative Example 2 at a rate of 135 C.

Moreover, FIG. 2 shows the result of a high-rate discharge test (at 135 C for 3 s) of the lithium ion batteries in Example 6 and Comparative Example 2. It can be seen from the discharge voltage-time curve at a rate of 135 C in FIG. 2 that after continuous discharge at 135C for 3 s, the cut-off voltage in Example 6 can still be maintained at a high level. This indicates that during the discharge process of the lithium ion battery in Example 6, electrochemical polarization is alleviated, and kinetic performance is improved.

2. Examples 23-30

The thin film coating process can further optimize the high-rate charge and discharge performance of lithium ion batteries on the basis of the modification of the graphite anode material. The thin film coating process depends largely on the thickness of the anode active material layer after cold pressing. The coating weight is closely related to the battery power and cycle performance.

The preparation process of the anodes in Examples 23-30 were as follows.

Preparation of anode: Artificial graphite meeting the relationship equations $0.06 \times (Dv50)^2 - 2.5 \times Dv50 + Dv99 = 5$ and $0.2 \times Dv50 - 0.006 \times (Dv50)^2 + BET = 2.7$, styrene-butadiene rubber (SBR), and sodium carboxymethylcellulose (CMC) were dispersed in a deionized water solvent at a weight ratio of 97.4:1.2:1.4, mixed uniformly by fully stirring, coated on a Cu foil anode current collector pre-coated with a 1 μm-thick acetylene black conductive coating, dried, and cold pressed to obtain an anode, wherein the artificial graphite had amorphous carbon on its surface. The Dv99 of the anode material and the single-side cold pressed thickness THK of the anode active material layer were controlled to meet the following relationship equation: $Dv99 \leq 0.8THK \leq 40$; and the thickness THK of the anode active material layer and the coating weight CW of the anode material were controlled to meet the following relationship equation: $1.2 \leq CW/(THK \times 1540.25) \times 1000 \leq 1.9$.

CW represents the coating weight in mg of the anode active material layer (graphite+binder+dispersant) in an area of 1540.25 mm² on one side of the anode after cold pressing.

By adjusting the gap between the coating roller and the back roller during the coating process, anodes with coatings having varying THKs and CWs were obtained, thereby further obtaining anodes that meet the above-mentioned relationship equations.

The preparation processes of the cathode, the separator, the electrolyte and the lithium ion battery were the same as the preparation processes of the cathode, the separator, the electrolyte and the lithium ion battery in Examples 1-22 and Comparative Examples 1-3.

Table 2 shows the adopted Dv99, 0.8THK, and the correlation coefficient between CW and THK (compacted density) of the graphite, the appearance of the anode, the DC resistance (DCR), the discharge voltage at 135 C for 3 s, and the capacity retention rate after 500 cycles at 1.5 C at 45° C. of the lithium ion battery in Examples 23-30.

TABLE 2

|  | $1.2 \leq CW/(THK \times 1540.25) \times 1000 \leq 1.9$ | Dv99 (μm) | 0.8THK (μm) | Cold-pressed appearance | Discharge voltage at 135 C. for 3 s | Capacity retention rate |
|---|---|---|---|---|---|---|
| Example 23 | 1.60 | 20 | 20 | Protrusions of particles | 2.51 | 87.90% |
| Example 24 | 1.50 | 20 | 21 | Slight protrusion of particles | 2.52 | 87.80% |
| Example 25 | 1.3 | 20 | 24 | Excellent | 2.54 | 87.30% |
| Example 26 | 1.45 | 20 | 22 | Excellent | 2.53 | 87.70% |
| Example 27 | 1.45 | 15 | 22 | Excellent | 2.56 | 86.90% |
| Example 28 | 1.45 | 18 | 22 | Excellent | 2.55 | 87.20% |
| Example 29 | 1.45 | 22 | 22 | Slight protrusion of particles | 2.50 | 87.80% |
| Example 30 | 1.45 | 30 | 22 | Protrusions of particles, and scratches | 2.49 | 87.90% |

Therefore, on the basis of the foregoing examples, the influence of the relationship between the Dv99 of the anode material and the thickness THK of the anode active material layer, and the relationship between the thickness THK of the anode active material layer and the coating weight CW of the anode active material layer on the performance were studied in Examples 23-30.

The analysis of Examples 23-30 shows that when other factors remain unchanged, the appearance of Examples 23-29 meeting relationship equation (3) $Dv99 \leq 0.8THK \leq 40$ is better than that of Example 30 with an anode material not meeting relationship equation (3). This is mainly because that with a Dv99 within this range, the occurrence of large particles blocking the tip of the coater blade is reduced during the coating process, and the appearance of scratches after cold pressing is reduced. After the cold pressing, there will be fewer large protrusions.

By adjusting the relationship between the thickness THK of the anode active material layer and the coating weight CW of the anode material, it is found with the anode material meeting relationship equation (3) $Dv99 \leq 0.8THK \leq 40$ and relationship equation (4) $1.2 \leq CW/(THK \times 1540.25) \times 1000 \leq 1.9$, both the discharge voltage at 135 C for 3 s and the cold-pressed appearance are improved to some extent. This may be because within this range, the transmission path of the lithium ions becomes shorter, electrode polarization is slight, side reactions are reduced, and the consumption of the lithium ions is lowered, showing a high discharge voltage at 135 C for 3 s, and good dynamic performance. Moreover, the appearance of the surface of the anode is good.

3. Examples 31-36

To discuss the influence of the conductive coating on the anode current collector on the performance of lithium-ion batteries, the influence of the presence, type and thickness of the conductive coating on the anode current collector on the electrochemical performance of lithium ion batteries were further discussed in Examples 31-36 on the basis of the foregoing research.

The preparation method of Examples 31-34 was basically the same as that of Example 26 described above, except that the thickness of the conductive coating on the current collector of Examples 31-34 varied.

The preparation method of Example 35 was basically the same as that of Example 26 described above, except that the conductive coating on the current collector of Example 35 was a graphene coating.

The preparation method of Example 36 was basically the same as that of Example 26 described above, except that no conductive coating was present on the current collector of Example 35.

Table 3 shows the thickness of the conductive coating on the current collector, the type of the conductive coating, the DCR, the discharge voltage at 135 C for 3 s, and the capacity retention rate after 500 cycles at 1.5 C at 45° C. of the lithium-ion battery in Examples 31-36.

TABLE 3

|  | Thickness of conductive coating (μm) | Type of conductive coating | DCR (mΩ) | Discharge voltage at 135 C for 3 s |
|---|---|---|---|---|
| Example 26 | 1 | Acetylene black | 11.10 | 2.53 |
| Example 31 | 0.5 | Acetylene black | 12.09 | 2.39 |
| Example 32 | 0.8 | Acetylene black | 11.77 | 2.51 |
| Example 33 | 1.1 | Acetylene black | 11.06 | 2.53 |
| Example 34 | 1.5 | Acetylene black | 10.59 | 2.57 |
| Example 35 | 1 | Graphene | 11.03 | 2.55 |
| Example 36 | 0 | No | 13.28 | 2.26 |

The analysis of Examples 26 and 31-36 shows that when the conductive coating on the current collector is from about 0.5 μm to about 1.5 μm, the DCR of the anode is low. This is because the conductive coating on the current collector contributes to the conduction of electrons and increases the adhesion of the active material layer to the current collector to reduce the peeling of the active material layer during cycling, so that lowered charge transfer resistance and better dynamics are exhibited.

4. Examples 37-41

On the basis of foregoing research, the influence of porosity of the anode active material and C004/C110 of the anode material before and after charging on the electrochemical performance of the lithium ion batteries was further discussed in Examples 37-41.

The preparation method of Examples 37-41 was basically the same as that of Example 32 described above, except that the porosity of the active material layer in Examples 37-41 varied.

Table 4 shows the porosity of the active material layer, DCR, C004/C110 before and after charging, the discharge voltage at 135 C for 3 s and the capacity retention rate after 500 cycles at 1.5 C at 45° C. in Examples 37-41.

TABLE 4

|  | Porosity of active material layer (%) | DCR (mΩ) | $C_{004}/C_{110}$ ratio before charge | $C_{004}/C_{110}$ ratio after charge | Discharge voltage at 135 C. for 3 s | Capacity retention rate |
|---|---|---|---|---|---|---|
| Example 32 | 35 | 11.77 | 14.80 | 8.51 | 2.51 | 88.0% |
| Example 37 | 31 | 12.0 | 16.01 | 9.05 | 2.47 | 88.70% |
| Example 38 | 33 | 11.89 | 15.36 | 8.89 | 2.50 | 88.50% |
| Example 39 | 38 | 11.27 | 13.41 | 8.38 | 2.55 | 88.1% |
| Example 40 | 41 | 11.07 | 12.61 | 8.02 | 2.58 | 87.50% |
| Example 41 | 55 | 11.09 | 11.17 | 7.28 | 2.57 | 85.70% |

From Examples 32 and 37-40, it can be seen that when the porosity is 31% to 41%, the DCR and the discharge performance at 135 C for 3 s have been improved to some extent. This may be because the porosity in such a range allows the electrolyte to penetrate the surface of the graphite layer more easily, such that the lithium ions can directly reach the surface of graphite to complete lithium intercalation, which greatly shortens the transmission path of the lithium ions, enables the SEI film to be in a proper range, and reduces excessive lithium ion loss. With a too large porosity, although the dynamic performance has been improved to some extent, the cycle life is greatly reduced since more SEI films are formed and more lithium ions are consumed, as shown in Example 41.

When the $C_{004}/C_{110}$ ratio is within a certain range, the solvated lithium ions are ensured to well infiltrate with the electrolyte to reach the graphite surface better and undergo intercalation and deintercalation quickly, and the excessive formation of an SEI film is reduced to maintain a good cycle life.

Described above are embodiments listed in the present application. However, since the applicant cannot exhaust all the embodiments, all other equivalent embodiments which are obtained based on the teaching of the present application fall within the protection scope of the present application. In summary, the present application provides a simple method suitable for use in industrial production to prepare an anode material with high rate performance.

References throughout the specification to "some embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

The above description summarizes the features of several embodiments, which will enable those of ordinary skill in the art to better understand various aspects of the present application. Those of ordinary skill in the art can readily use the present application as a basis for designing or modifying other compositions to achieve the same objectives and/or the same advantages as the embodiments herein. It is also to be understood by those of ordinary skill in the art that these equivalent examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, the order and grouping of operations are not a limitation to the present application unless specifically indicated herein.

What is claimed is:

1. An electrochemical device, comprising:
a cathode;
a separator;
an electrolyte; and
an anode, wherein the anode comprises an anode current collector and an anode active material layer disposed on at least one surface of the anode current collector, wherein the anode active material layer comprises an anode material having $$0.8 \leq 0.06 \times (Dv50)^2 - 2.5 \times Dv50 + Dv99 \leq 12, \text{ and}$$

Dv50 represents a numerical value of a particle size in a volume-based particle size distribution of the anode material that is greater than particle sizes of 50% of particles of the anode material, Dv99 represents a numerical value of a particle size in the volume-based particle size distribution of the anode material that is greater than particle sizes of 99% of particles of the anode material, Dv50 and Dv99 are numerical values of the particle sizes as expressed in μm, and the anode active material layer of the anode has a C004/C110 ratio of 11.81 to 17.08.

2. The electrochemical device according to claim 1, wherein $$1.0 \leq 0.06 \times (Dv50)^2 - 2.5 \times Dv50 + Dv99 \leq 11.6.$$

3. The electrochemical device according to claim 1, wherein $$1.5 \leq 0.06 \times (Dv50)^2 - 2.5 \times Dv50 + Dv99 \leq 5.8.$$

4. The electrochemical device according to claim 1, wherein the anode active material layer has a porosity of 31% to 41%.

5. The electrochemical device according to claim 1, wherein the particle size Dv99 of the anode material and a thickness THK of the anode active material layer meet the following relationship equation:

$$Dv99 \leq 0.8\text{THK} \leq 40, \text{ and}$$

THK represents a numerical value of the thickness of the anode active material layer as expressed in μm.

6. The electrochemical device according to claim 1, wherein a coating weight of the anode active material layer and a thickness of the anode active material layer meet the following relationship equation:

$$1.2 \leq CW/(THK \times 1540.25) \times 1000 \leq 1.9;$$

wherein CW represents a numerical value of the coating weight as expressed in mg of the anode active material layer in an area of 1540.25 mm$^2$ on one surface of the anode current collector, and THK represents a numerical value of the thickness of the anode active material layer as expressed in μm.

7. The electrochemical device according to claim 6, wherein the anode active material layer has the CW of 40 to 100.

8. The electrochemical device according to claim 1, the anode material having $$1.2 \leq 0.2 \times Dv50 - 0.006 \times (Dv50)^2 + BET \leq 5;$$

wherein BET is a numerical value of a specific surface area of the anode material, and BET is the numerical value of the specific surface area as expressed in m$^2$/g.

9. The electrochemical device according to claim 1, further comprising:
a conductive coating between the anode active material layer and the current collector, wherein the conductive coating comprises one or more selected from the group consisting of carbon fibers, Ketjen black, acetylene black, carbon nanotubes, and graphene.

10. The electrochemical device according to claim 9, wherein the conductive coating has a thickness of 0.5 μm to 1.5 μm.

11. The electrochemical device according to claim 1, wherein the anode active material layer of the anode has a $C_{004}/C_{110}$ ratio of 7.45 to 9.57 after the electrochemical device is fully charged and disassembled.

12. An electrochemical device, comprising:
a cathode;
a separator;
an electrolyte; and
an anode, wherein the anode comprises an anode current collector and an anode active material layer disposed on at least one surface of the anode current collector, wherein the anode active material layer comprises an anode material,
the anode material having $$1.2 \leq 0.2 \times Dv50 - 0.006 \times (Dv50)^2 + BET \leq 5,$$

Dv50 represents a numerical value of a particle size in a volume-based particle size distribution of the anode material that is greater than particle sizes of 50% of particles of the anode material, BET is a numerical value of a specific surface area of the anode material, Dv50 is a numerical value of the particle sizes as expressed in μm and BET is a numerical value of the specific surface area as expressed in m$^2$/g, and the anode active material layer of the anode has a C004/C110 ratio of 11.81 to 17.08.

13. The electrochemical device according to claim 12, wherein $$2.2 \leq 0.2 \times Dv50 - 0.006 \times (Dv50)^2 + BET \leq 5.$$

14. The electrochemical device according to claim 12, wherein $$1.2 \leq 0.2 \times Dv50 - 0.006 \times (Dv50)^2 + BET \leq 3.6.$$

15. The electrochemical device according to claim 12, wherein the anode active material layer has a porosity of 31% to 41%.

16. The electrochemical device according to claim 12, wherein the particle size Dv99 of the anode material and a thickness THK of the anode active material layer meet the following relationship equation: $Dv99 \leq 0.8\text{THK} \leq 40$, and THK represents a numerical value of the thickness of the anode active material layer as expressed in μm.

17. The electrochemical device according to claim 12, wherein a coating weight of the anode active material layer and a thickness of the anode active material layer meet the following relationship equation:

$$1.2 \leq CW/(THK \times 1540.25) \times 1000 \leq 1.9;$$

wherein CW represents only a numerical value of the coating weight as expressed in mg of the anode active material layer in an area of 1540.25 mm² on one surface of the anode current collector, and THK represents a numerical value of the thickness of the anode active material layer as expressed in μm.

18. The electrochemical device according to claim 17, wherein the anode active material layer has the CW of 40 to 100.

19. The electrochemical device according to claim 12, wherein the anode active material layer of the anode has a $C_{004}/C_{110}$ ratio of 7.45 to 9.57 after the electrochemical device is fully charged and disassembled.

20. The electrochemical device according to claim 12, wherein the anode material having $$0.8 \leq 0.06 \times (Dv50)^2 - 2.5 \times Dv50 + Dv99 \leq 12,$$

Dv99 represents a numerical value of a particle size in the volume-based particle size distribution of the anode material below which the volume-based particle sizes of 99% of the particles of the anode material fall, and Dv99 is a numerical value of the particle size as expressed in μm.

21. The electrochemical device according to claim 12, further comprising:
 a conductive coating between the anode active material layer and the current collector, the conductive coating comprises one or more selected from the group consisting of carbon fibers, Ketjen black, acetylene black, carbon nanotubes, and graphene.

22. The electrochemical device according to claim 21, wherein the conductive coating has a thickness of 0.5 μm to 1.5 μm.

* * * * *